United States Patent
Chervenka

[11] 3,778,171
[45] Dec. 11, 1973

[54] SAMPLE CELL FOR ULTRACENTRIFUGE UTILIZING-MULTIPLE-BEAM INTERFERENCE OPTICS

[75] Inventor: Charles Henry Chervenka, Sunnyvale, Calif.

[73] Assignee: Beckman Instruments, Inc., Fullerton, Calif.

[22] Filed: Nov. 9, 1972

[21] Appl. No.: 304,909

[52] U.S. Cl.............. 356/246, 233/26, 250/218, 356/197
[51] Int. Cl........................ G01n 1/10, G01n 21/24
[58] Field of Search.................... 356/197, 246; 250/218; 233/26

[56] References Cited
UNITED STATES PATENTS
3,391,597  7/1968  Gropper.............................. 250/218

Primary Examiner—David Schonberg
Assistant Examiner—V. P. McGraw
Attorney—Stanley M. Teigland et al.

[57] ABSTRACT

This invention provides a sample cell for an analytical ultracentrifuge which allows recording of solution-solvent fringes and solvent-solvent fringes simultaneously from the cell under exactly the same experimental conditions. A unique feature of the cell is that it permits the passage of three or four beams of light through it, rather than the usual two. The multiple beams of light form two sets of interference patterns, from which one can correct for the contribution of cell windows to refractive index changes.

5 Claims, 3 Drawing Figures

PATENTED DEC 11 1973 3,778,171
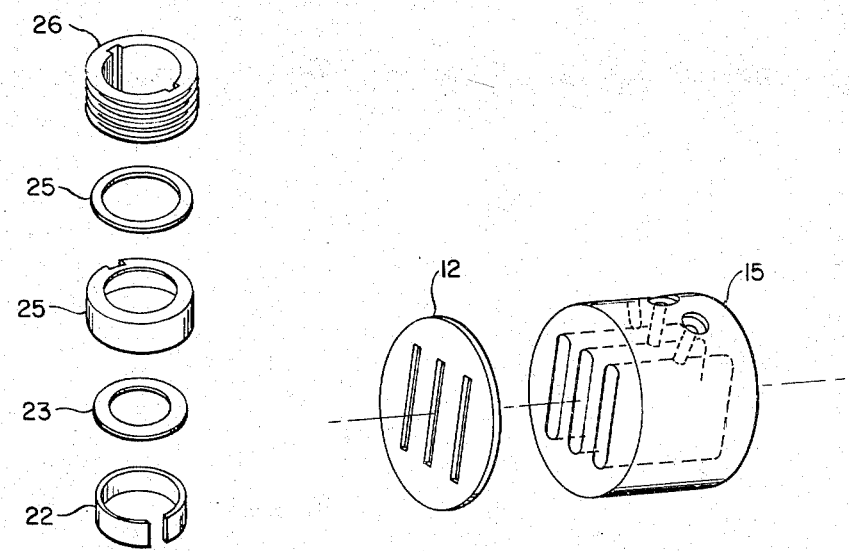
FIG. 2
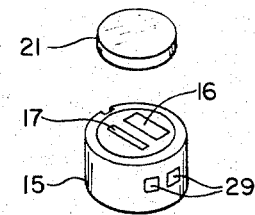
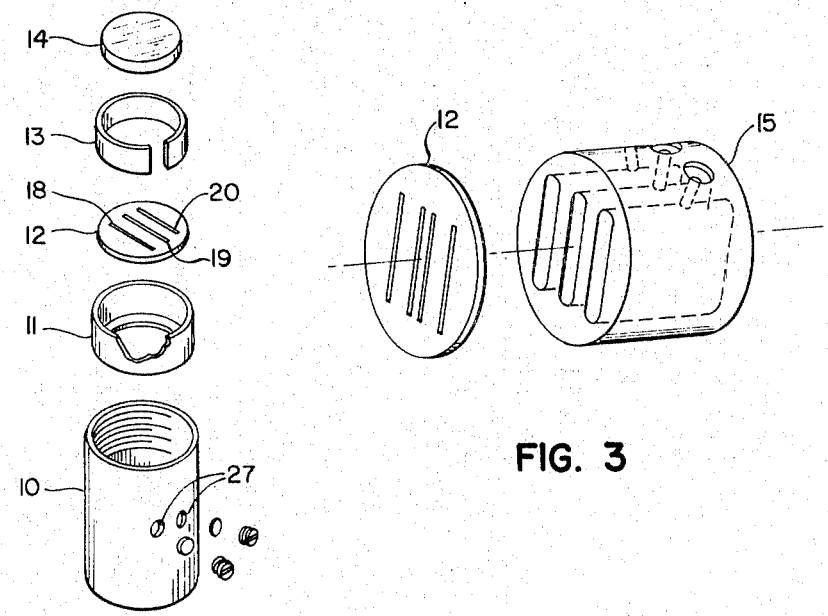
FIG. 3
FIG. 1

SAMPLE CELL FOR ULTRACENTRIFUGE UTILIZING-MULTIPLE-BEAM INTERFERENCE OPTICS

BACKGROUND OF THE INVENTION

Analytical ultracentrifuges are used to study the distribution of macromolecules in solution under the influence of a centrifugal field. A dilute solution of a sample of the macromolecule is placed in one sector of a centrifuge cell and solvent is placed in another sector of the cell. Changes in the distribution of the sample in the cell under the influence of high centrifugal forces are followed by measuring the resulting changes in refractive index. Changes in refractive index are measured by means of a Rayleigh interferometer, which forms an optical pattern of fringes by interference of light passing through each sector of the centrifuge cell. Differences in refractive index in the cell cause shifts or bending of the fringes in the pattern. Measurement of these shifts permits quantitative analysis of refractive index changes in the cell. However, the refractive index changes in the cell reflect not only changes in distribution of the sample, but also contributions due to inhomogeneity in the refractive index of the transparent optical windows used to enclose the cell. The cell windows are not absolutely perfect and they distort under the influence of the high centrifugal force. In order to correct for the contribution of the cell windows to refractive index, a separate ultracentrifuge run is made in which both sectors are filled with solvent. The fringe displacement is measured as a function of radius for this condition, and the values obtained are subtracted from the values obtained in the condition in which one sector of the cell is filled with sample solution. This procedure of correcting for the contribution of the cell windows to refractive index is tedious and uncertain because the fringe displacement may change with rotor speed or by disassembly and reassembly of the cell.

SUMMARY OF THE INVENTION

This invention provides a sample cell for an analytical ultracentrifuge which allows recording of solution-solvent fringes and solvent-solvent fringes simultaneously from the cell under exactly the same experimental conditions. A particular advantage of the invention is that it involves only a modification of the conventional sample cell of an analytical ultracentrifuge. A conventional sample cell comprises a centerpiece having two sectors of about equal size, windows adjacent each side of the centerpiece, holders for the windows, and a housing for the elements of the cell. In this invention, the centerpiece has either two sectors, one sector being larger than the other, or three symmetrical sectors, and the cell includes a mask between the window nearer the source of light and the holder for the window, the mask having three or four slits arranged such that, where the centerpiece has two sectors, one slit is aligned over the smaller sector and two other slits are aligned over the larger sector, or, where the centerpiece has three symmetrical sectors, the two outer slits are aligned over the two outer sectors, and the remaining slit or slits are aligned over the center sector, whereby light is transmitted through the sectors in beams corresponding to the slits.

BRIEF DESCRIPTION OF THE DRAWINGS

FIG. 1 is an exploded view of a sample cell in accordance with the present invention. The cell includes a centerpiece having two sectors, one larger than the other, and a mask having three slits aligned over the sectors.

FIG. 2 is a view of a centerpiece and a mask of a sample cell representing another embodiment of the invention. The centerpiece has three symmetrical sectors and the mask has three slits aligned respectively over the sectors.

FIG. 3 is a view of a centerpiece and a mask of a sample cell representing a third embodiment of the invention. The centerpiece has three symmetrical sectors, as in FIG. 2, but the mask has four slits, the two outer slits being aligned over the two outer sectors and the two inner slits being aligned over the center sector.

DETAILED DESCRIPTION

Referring to FIG. 1, the sample cell includes a housing 10 which accommodates the various parts of the cell assembly, a lower window holder 11, a mask 12, a liner 13, a window 14, and a centerpiece 15 having a large sector 16 and a smaller sector 17. Preferably, the larger sector 16 is about twice as wide as the smaller sector 17. The mask 12 has three parallel slits 18, 19, 20. One slit 18 is aligned over the smaller sector 17 and the other two slits 19, 20 are aligned over the larger sector 16. In a typical arrangement, two of the slits are equidistant from the center, while the third is three times the distance from the center as the other two. Above the centerpiece 15 are a window 21, liner 22, gasket 23, window holder 24, and gasket 25. A screw ring 26 is screwed down into the housing 10 to house and seal the complete assembly within the housing 10.

The two sectors are filled by means of syringe needles inserted through small openings 27 extending through the housing 10 and centerpiece 15. The large sector 16 is filled with solvent and the smaller sector 17 is filled with a solution of the sample to be analyzed.

The sample cell is then placed in a conventional analytical ultracentrifuge. Such ultracentrifuges include a source of light and means for directing the light through the sample cell. In conventional ultracentrifuges, the light passes through a cell containing two interference slits in the lower window holder assembly, and then continues to a condensing lens over which is placed a condensing lens mask having slits corresponding substantially to the interference slits in the cell. The condensing lens focuses the light, forming interference fringes at an image plane. In accordance with this invention, the light travels through the three slits 18, 19, 20 of the mask 12, forming three parallel beams of light. The three beams of light form two sets of interference patterns. When slits 18 and 19 are aligned under the conventional condensing lens mask, solution-solvent fringes are formed at the image plane. When slits 19 and 20 are aligned under the condensing lens mask, solvent-solvent fringes are formed at the image plane. A photographic plate at the image plane accumulates these light patterns and records them as two sets of superimposed fringe patterns.

FIG. 2 depicts a centerpiece 15 and a mask 12 employed in a sample cell representing another embodiment of this invention. The centerpiece 15 has three symmetrical sectors; and the mask 12 has three slits aligned respectively over the three sectors. When two adjacent sectors are filled with solvent and the third is filled with sample solution, two sets of interference fringes are formed in a manner similar to that described in connection with FIG. 1. An interesting variation occurs, however, when sample solution is placed in the center sector and solvent is placed in the other two. The two sets of interference fringes formed are both between solvent and solution, but the bending of the fringes is in opposite directions, with the result that a deflection between conjugate fringes in the two sets equals twice that for sample and baseline fringes. Thus, the sensitivity of the interference optics for measuring changes in refractive index is effectively doubled.

FIG. 3 depicts a centerpiece 15 and a mask 12 employed in a sample cell representing a third embodiment of this invention. The centerpiece 15 has three symmetrical sectors; and the mask 12 has four slits. The two outer slits are aligned over the two outer sectors and the two inner slits are aligned over the center sector. When two adjacent sectors are filled with solvent and the third is filled with sample solution, two sets of interference fringes are formed. By employing a half-plane, half-wedge upper window in the cell, as described in U.S. Pat. No. 3,391,597, the two sets of interference fringes can be separated. Being separated, the fringe patterns are easier to interpret than the superimposed fringe patterns formed by the embodiments of FIGS. 1 and 2. Preferably, the angle of the wedge is from about ¼° to 1°.

Thus, in accordance with this invention, in a single experiment and in a single ultracentrifuge run one can obtain an interference pattern which shows the position of solvent-solvent (baseline) fringes as well as the displacement of fringes due to refractive index distributions in the sample sector of the cell. The baseline fringes formed in accordance with this invention have the highest possible reliability because they use the same portion of solvent as the solution-solvent fringes in the same cell and under the same experimental conditions of temperature, rotor speed, and window distortion. Thus, one can make a correction for nonuniform thickness and refractive index contribution of the cell windows directly from measurements on the photographic record.

What is claimed is:

1. In a sample cell for an analytical ultracentrifuge, the ultracentrifuge including a source of light and means for directing the light through the sample cell, and the sample cell comprising a centerpiece having sectors for a solvent and a solution of a sample to be analyzed, windows adjacent each side of the centerpiece, holders for the windows, and a housing for the elements of the cell, the improvement wherein the centerpiece has either two sectors, one sector being larger than the other, or three symmetrical sectors, and the cell includes a mask between the window nearer the source of light and the holder for the window, the mask having three or four slits arranged such that, where the centerpiece has two sectors, one slit is aligned over the smaller sector and two other slits are aligned over the larger sector, or, where the centerpiece has three symmetrical sectors, two slits are aligned respectively over two sectors, and the remaining slit or slits are aligned over the third sector, the third sector being between the other two sectors when the mask has four slits, whereby the light is transmitted through the sectors in beams corresponding to the slits.

2. In a sample cell for an analytical ultracentrifuge, the ultracentrifuge including a source of light and means for directing the light through the sample cell, and the sample cell comprising a centerpiece having sectors for a solvent and a solution of a sample to be analyzed, windows adjacent each side of the centerpiece, holders for the windows, and a housing for the elements of the cell, the improvement wherein the centerpiece has two sectors, one sector being larger than the other, and the cell includes a mask between the window adapted to be nearer the source of light and the holder for the window, the mask having three slits arranged such that one slit is aligned over the smaller sector and the two other slits are aligned over the larger sector, whereby light is transmitted through the sectors in beams corresponding to the slits.

3. The improvement of claim 2 wherein one sector is about twice as wide as the other sector.

4. In a sample cell for an analytical ultracentrifuge, the ultracentrifuge including a source of light and means for directing the light through the sample cell, and the sample cell comprising a centerpiece having sectors for a solvent and a solution of a sample to be analyzed, windows adjacent each side of the centerpiece, holders for the windows, and a housing for the elements of the cell, the improvement wherein the centerpiece has three symmetrical sectors and the cell includes a mask between the window nearer the source of light and the holder for the window, the mask having three slits aligned respectively over the sectors, whereby light is transmitted through the sectors in beams corresponding to the slits.

5. In a sample cell for an analytical ultrancentrifuge, the ultracentrifuge including a source of light and means for directing the light through the sample cell, and the sample cell comprising a centerpiece having sectors for a solvent and a solution of a sample to be analyzed, windows adjacent each side of the centerpiece, holders for the windows, and a housing for the elements of the cell, the improvement wherein the centerpiece has three symmetrical sectors and the cell includes a mask between the window nearer the source of light and the holder for the window, the mask having four slits arranged such that the two outer slits are aligned over the two outer sectors and the two inner slits are aligned over the center sector, whereby light is transmitted through the sectors in beams corresponding to the slits.

* * * * *